(12) United States Patent
Lee (10) Patent No.: US 10,779,925 B1
(45) Date of Patent: Sep. 22, 2020

(54) ELECTRICALLY DRIVEN TOOTHBRUSH

(71) Applicant: Shummi Enterprise Co., Ltd., Taipei (TW)

(72) Inventor: Chia-Lin Lee, Taipei (TW)

(73) Assignee: SHUMMI ENTERPRISE CO., LTD., Taipei (TW)

( * ) Notice: Subject to any disclaimer, the term of this patent is extended or adjusted under 35 U.S.C. 154(b) by 0 days.

(21) Appl. No.: 16/419,385

(22) Filed: May 22, 2019

(51) Int. Cl.
*A46B 13/02* (2006.01)
*A61C 17/22* (2006.01)
*A61C 17/34* (2006.01)

(52) U.S. Cl.
CPC ............ *A61C 17/221* (2013.01); *A46B 13/02* (2013.01); *A61C 17/225* (2013.01); *A61C 17/3481* (2013.01); *A46B 2200/1066* (2013.01)

(58) Field of Classification Search
CPC . A61C 17/221; A61C 17/225; A61C 17/3481; A46B 13/02
See application file for complete search history.

(56) References Cited

U.S. PATENT DOCUMENTS

| 7,571,508 | B1* | 8/2009 | Yufa ...................... A46B 13/02 15/144.4 |
| 2003/0037391 | A1* | 2/2003 | Pfenniger ........... B29C 45/0062 15/143.1 |

\* cited by examiner

*Primary Examiner* — Randall E Chin
(74) *Attorney, Agent, or Firm* — Muncy, Geissler, Olds & Lowe, P.C.

(57) ABSTRACT

The present invention provides an electrically driven toothbrush, which comprises a hollow handle, an electrical assembly module in electrical connection with a pair of spring and a cap member. The hollow handle includes a first end provided with a tooth brushing portion and a second end provided with an opening. The electrical assembly module in electrical connection with the spring is inserted into the hollow handle through the opening. The cap member is removably attached to the hollow handle through and closes the opening. By bending the cap member, two spring coils of the pair of spring make contact with each other so as to conduct an electrical path to the electrical assembly module for turning on the electrically driven toothbrush structure. By designing the proposed structure of the present invention, it successfully achieves the purpose of improving and enhancing the conveniences of use for users.

11 Claims, 10 Drawing Sheets

ELECTRICALLY DRIVEN TOOTHBRUSH

BACKGROUND OF THE INVENTION

Field of the Invention

The present invention relates to a toothbrush structure, and more particularly to an electrically power driven toothbrush structure.

Description of the Prior Art

Toothbrush structures have been widely utilized in a variety of consumers' daily lives, and have been especially developed for the purpose of achieving a reduction in time for brushing a user's teeth. And therefore, as compared with manually operated toothbrushes, power-driven toothbrush structures have been making such improvements in convenience of use in those fields.

Typically, such power-driven toothbrush structures generally comprise a conversion type of toothbrush and a vibration type of toothbrush. The conversion type of toothbrush has an electrically operated motor disposed inside its main body so as to generate a revolving force, and further resulting in a revolving force-converting mechanism disposed therein for changing the revolving force into, e.g., either a rolling motion or a sliding motion.

In another aspect, the vibration type of toothbrush has an eccentric weight attached to the electrically operated motor. Either type of the above mentioned toothbrush structures is a hygienic appliance in which its tooth brushing portion is positioned at front end of the toothbrush main body for contacting with the user's teeth so as to brush the teeth surface and to protect the teeth and the gums against cavities.

As for the typical electrically driven toothbrush structure, it usually allows the tooth brushing portion constructed to be able to be removed from its handle portion such that the tooth brushing portion can be replaceable. However, in the assembly process of the toothbrush structure, mounting mechanisms having complicated structures are usually used for instance, when the tooth brushing portion or the motor is mounted to or into the handle portion, or when a dry cell or charging battery is attached to the handle portion. Moreover, the mounting mechanisms will probably get loose from time to time along with the assembly of the toothbrush. Alternatively, the dry cell or charging battery cannot be always positively retained within the toothbrush. Replacements of the dry cells or charging batteries are always necessary and thus consume a great amount of time and efforts. All of these result in inconveniences in the electrically driven toothbrush structures when being used, and in particular, in the above mentioned mounting mechanisms, which for now are known as being costly and difficult to manufacture.

On account of above, a variety of prior arts have made enormous efforts on improving and enhancing the conveniences of use for the electrically driven toothbrush structures. Nevertheless, it is believed that so far those achievements are still limited and cannot be utilized extensively. Therefore, in view of all, to overcome the above mentioned problems, it should be obvious that there is indeed an urgent need for the professionals in the field for a novel and inventive electrically driven toothbrush structure to be developed that can effectively solve those above mentioned problems occurring in the prior design.

SUMMARY OF THE INVENTION

In order to overcome the above mentioned disadvantages, one major objective in accordance with the present invention is provided for a novel electrically driven toothbrush structure. By employing the proposed electrically driven toothbrush structure of the present invention, it can be utilized so as to improve and enhance the conveniences of use for the electrically driven toothbrush structures.

For achieving the above mentioned objectives, the present invention provides an electrically driven toothbrush, which comprises a hollow handle having a first end provided with a tooth brushing portion and a second end provided with an opening. An electrical assembly module is configured for providing power output to turn on the electrically driven toothbrush, and to be inserted into the hollow handle through the opening of the second end. A pair of spring is in connection with the electrical assembly module and inserted into the hollow handle.

A cap member which is removably attached to the hollow handle through the opening closes the opening, forming an accommodation space for disposing the electrical assembly module in electrical connection with the pair of spring inside the hollow handle. According to a preferred embodiment of the present invention, the cap member is bendable such that the pair of spring becomes conductive forming an electrical path to the electrical assembly module to generate power for turning on the electrically driven toothbrush.

According to the preferred embodiment of the present invention, the pair of spring further comprises a first spring coil and a second spring coil which are disposed in parallel and having the first spring coil and the second spring connected to a bottom end to the cap member. As such, the cap member fixes the pair of spring at the bottom end which is opposite to the other end in connection with the electrical assembly module.

In practical, when a user bends the cap member, the first spring coil is getting to make contact with the second spring of the pair of spring such that the pair of spring becomes conductive and forms the aforesaid electrical path.

Moreover, for engaging mechanisms of the pair of spring onto the electrical assembly module, each of the pair of spring comprising the first spring coil and the second spring coil is further provided with a hook part. Also, the electrical assembly module is provided with a correspondingly plurality of slots, such that the hook part is configured to be clamped into the slot of the electrical assembly module so as to connect the pair of spring with the electrical assembly module. As a result, by such arrangements, the electrical assembly module is able to be in electrical connection with the pair of spring through the plurality of slot as well as clamping hook configurations.

By such arrangements, the electrical assembly module holds the pair of spring in place within the accommodation space of the hollow handle.

According to one embodiment of the present invention, the electrical assembly module, for example, can be a printed circuit board assembly (PCBA) or one module having an electrically operated motor disposed alternatively so as to generate a revolving force for turning on the electrically driven toothbrush structure.

Moreover, a socket portion can be further disposed upon a body of the hollow handle, and a grip component is configured to be clamped into the socket portion for enclosing the body of the hollow handle. Preferably, the grip component can be a stereoscopic shaped body for being fitted on a portion of any one of the hollow handle and the cap member at an external edge of a part where the hollow handle meshes with the cap member.

For example, the grip component is composed of an upper ring, a lower ring and a joint portion which is connecting between the upper ring and the lower ring. In general, the upper ring is configured for fitting with the socket portion, the lower ring is configured for surrounding the opening of the hollow handle, and the joint portion which is connecting between the upper ring and the lower ring is disposed along at least one side of the hollow handle. For better elastic bonding efficiency of the present invention, the grip component, for instance, can be selectively made of thermal plastic rubber.

As a result, when the user is about to operate the power driven toothbrush structure, the user bends the proposed cap member, which is designed as bendable. Under such circumstances, the two spring coils of the pair of spring make contact with each other, forming the electrical path conductive leading to the electrical assembly module, so the electrical power is generated to turn on the proposed electrically driven toothbrush structure as expected.

And thus, by employing the inventive design, it is believed that the proposed electrically driven toothbrush structure of the present invention can be applied and widely utilized so as to improve and enhance the conveniences of use for the consumers' daily lives as well as operated in a much easier manner for the users' daily living habits.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Since there are yet more inconveniences in that the complicated structure of the mounting mechanisms may greatly increase the dimension and weight of the electrically driven toothbrush structures, such a toothbrush is still inconvenient for use.

And also still inconvenience occurs when the electrically driven toothbrush structure is used in combination with any switch of a conventional structure for turning on the power driven toothbrush. More specifically, such switch is mostly designed with a predetermined as well as limited size and configuration merits. In addition, the power driven toothbrush structure, in which the aforesaid switch is to be incorporated, is usually subjected to certain restrictions so as to provide its original design. Based on that, inconsistence or otherwise enforced matching issues arise in respect of dimensions, mechanical systems, or switch design.

In order to solve the foregoing issues, the present invention provides an electrically driven toothbrush. Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Figure 1:
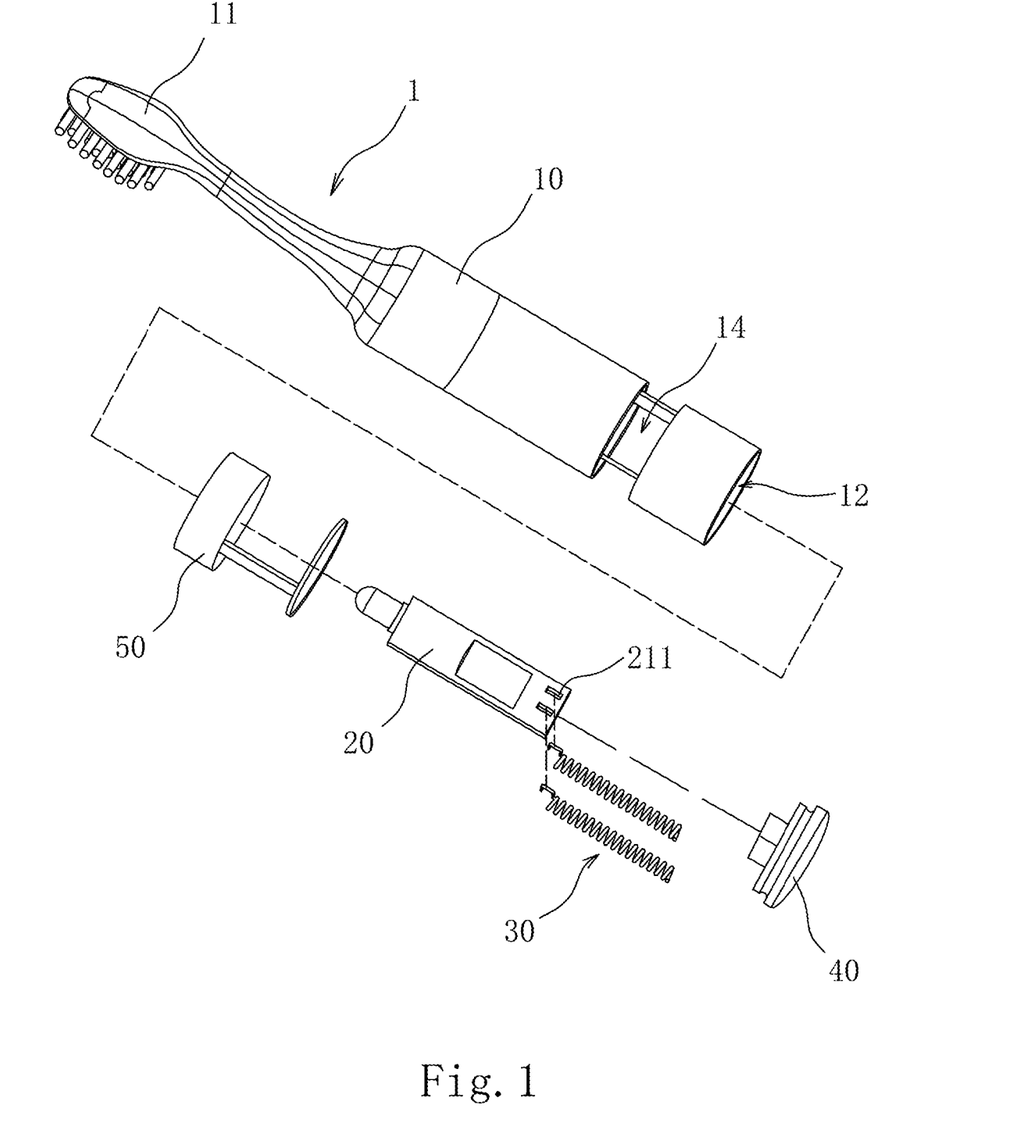
FIG. 1 shows an explosive sectional diagram of an electrically driven toothbrush in accordance with a preferred embodiment of the present invention.
Figure 2:
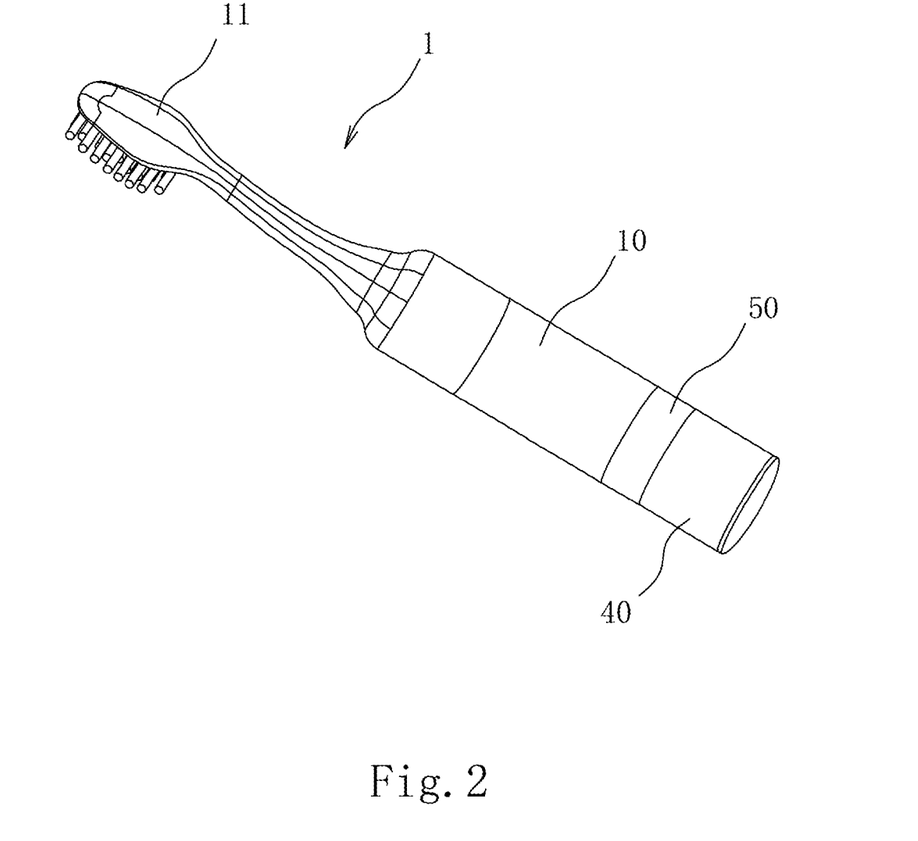
FIG. 2 shows a combination diagram of the components in FIG. 1 of the electrically driven toothbrush of the present invention.

Please refer to FIG. 1, which shows an explosive sectional diagram of an electrically driven toothbrush in accordance with a preferred embodiment of the present invention. FIG. 2 shows a combination diagram of the components in FIG. 1 of the electrically driven toothbrush of the present invention. As shown in the figures, the electrically driven toothbrush 1 of the present invention comprises a hollow handle 10, an electrical assembly module 20, a pair of spring 30, a cap member 40 and a grip component 50.

According to the embodiment of the present invention, the hollow handle 10 includes a first end provided with a tooth brushing portion 11 and a second end provided with an opening 12. The first end of the hollow handle 10 and the second end of the hollow handle 10 are opposite ends. The second end of the hollow handle 10 is open for providing an accommodation space for disposing electrical or mounting components there inside.

Figure 3:
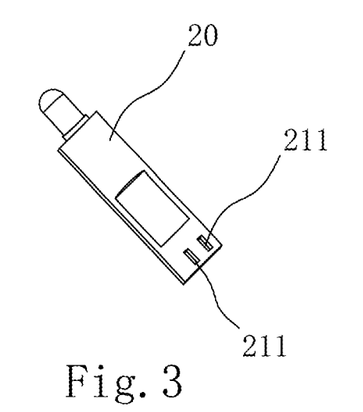
FIG. 3 shows a structural diagram of an electrical assembly module in accordance with a preferred embodiment of the present invention.

FIG. 3 shows a structural diagram of an electrical assembly module 20 in accordance with a preferred embodiment of the present invention. As shown in FIG. 3, the electrical assembly module 20 is provided with a plurality of slots 211. And, these slots 211 are configured for being engaged with a pair of spring 30 as shown in FIG. 4.

Figure 4:
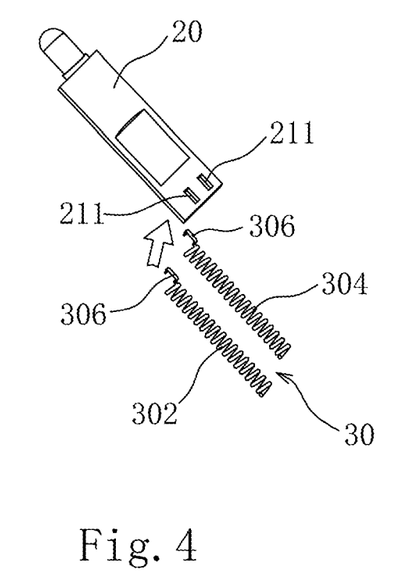
FIG. 4 shows a structural diagram of how the electrical assembly module in connection with a pair of spring in accordance with a preferred embodiment of the present invention.

Please refer to FIG. 4, which shows a structural diagram of how the electrical assembly module 20 being engaged with the pair of spring 30, in accordance with a preferred embodiment of the present invention. As shown in FIG. 4, the pair of spring 30 comprises a first spring coil 302 and a second spring coil 304 which are disposed in parallel. And, the first spring coil 302 and the second spring coil 304 are elastic. A plurality of more spring coils can be optionally disposed as well according to different design needs and specifications. A preferred embodiment is merely demonstrated herein to explain the technique features of the present invention, but not intended to limit thereto.

According to the embodiment of the present invention, each of the pair of spring 30 comprising the first spring coil 302 and the second spring coil 304 is further provided with a hook part 306. The hook part 306 of either the first spring coil 302 or the second spring coil 304 is configured to be clamped into the slot 211 of the electrical assembly module 20. By such arrangements of the hook parts 306 correspondingly clamped into the slots 211, the pair of spring 30 is able to be in connection with the electrical assembly module 20 in accordance with the preferred embodiment of the present invention.

Figure 5:
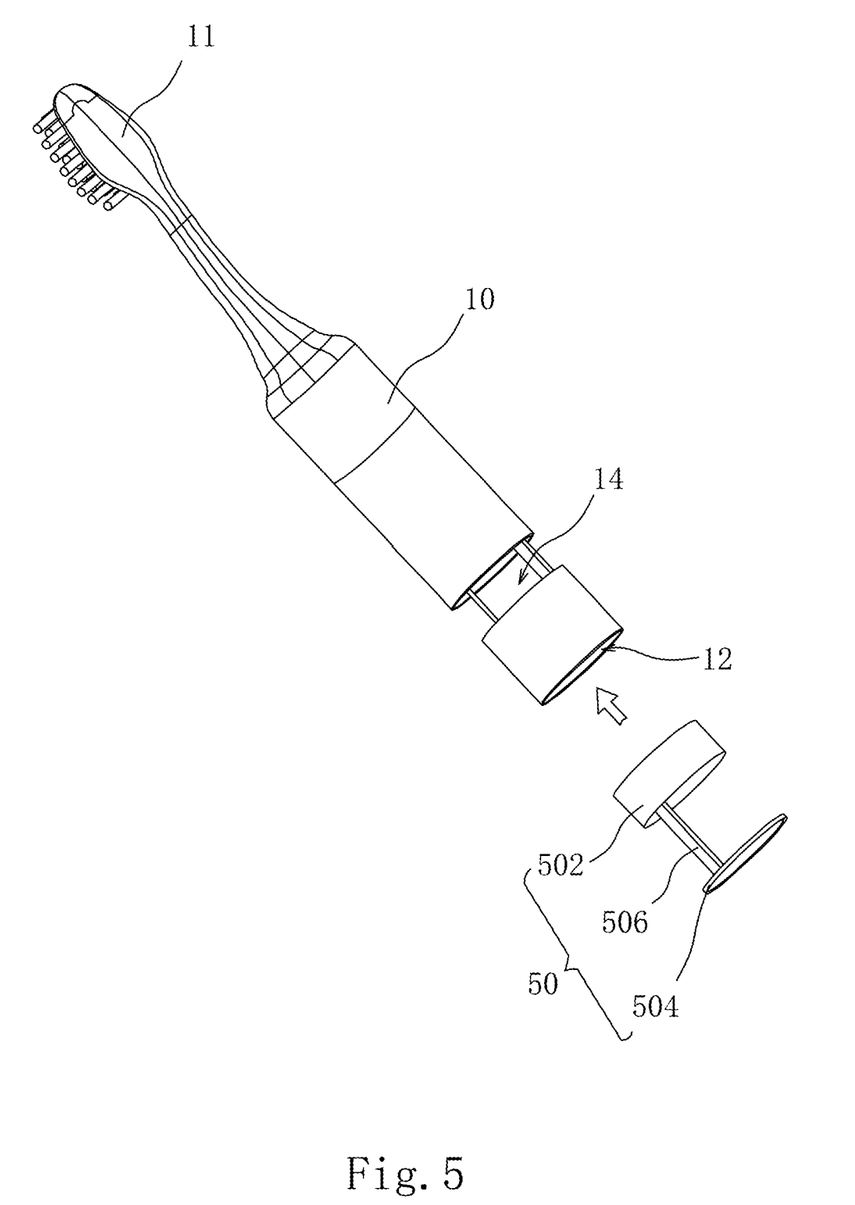
FIG. 5 shows a structural diagram of the proposed electrically driven toothbrush when a grip component is meshed with the hollow handle in accordance with a preferred embodiment of the present invention.
Figure 6:
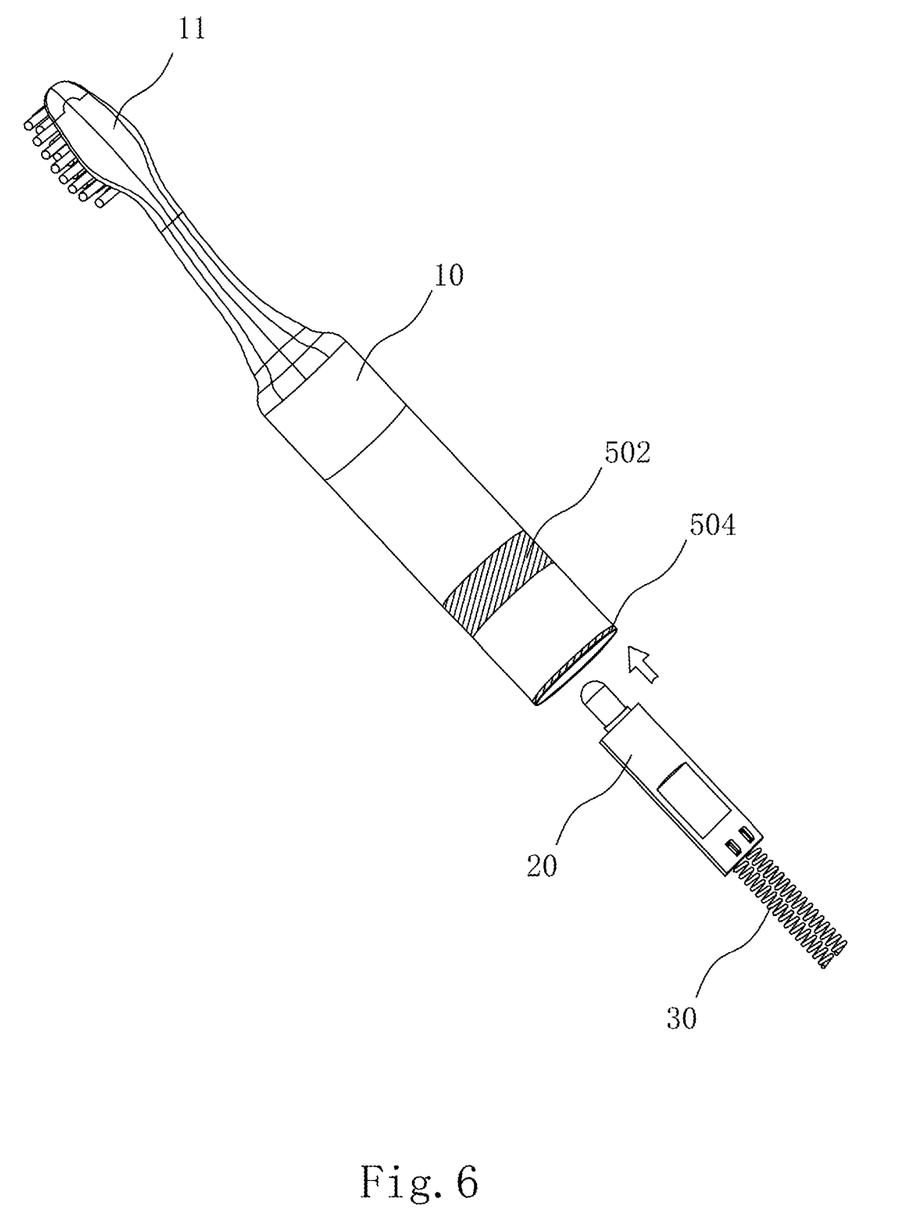
FIG. 6 shows a structural diagram from FIG. 5 showing how the electrical assembly module in connection with the pair of spring configured to be inserted into the hollow handle in accordance with a preferred embodiment of the present invention.
Figure 7:
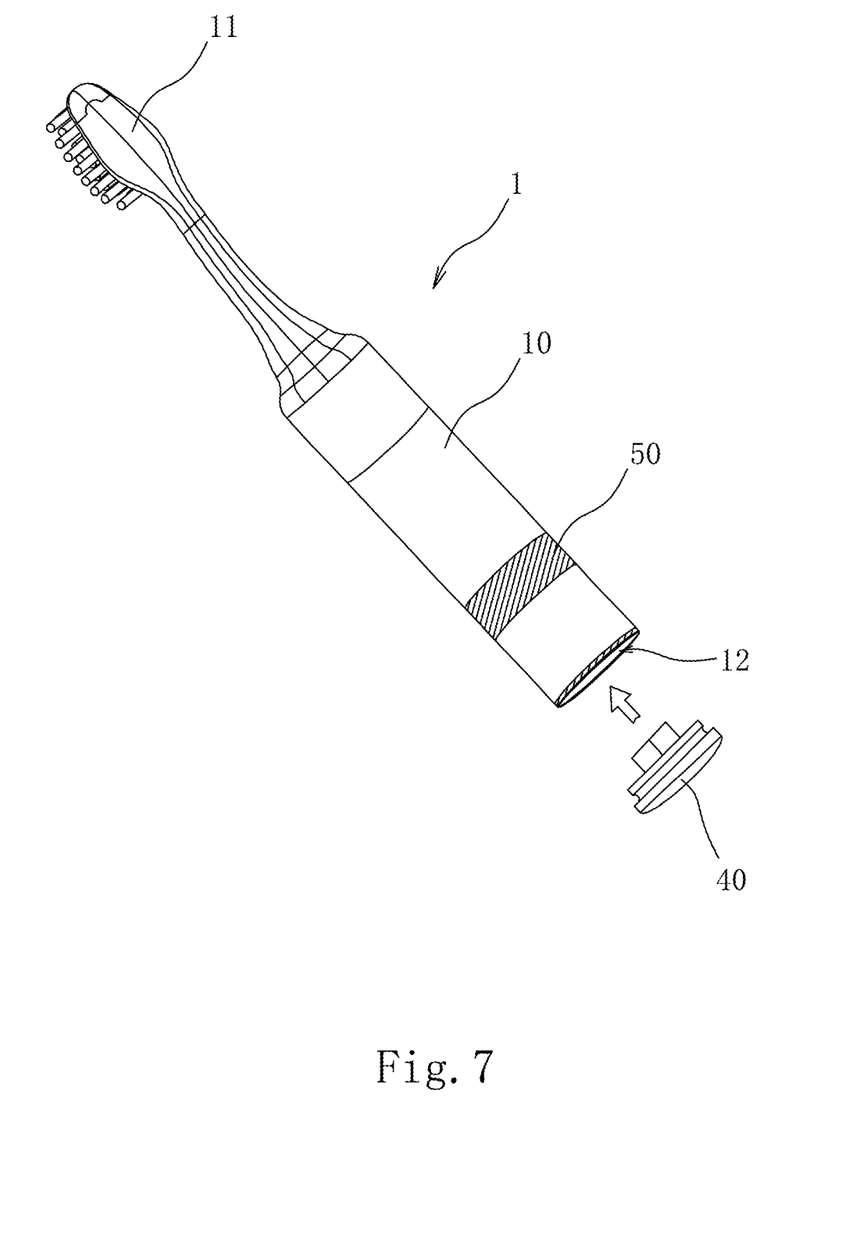
FIG. 7 shows a structural diagram of a cap member to be attached to the hollow handle through and closes the opening in accordance with a preferred embodiment of the present invention.

Further, please find referring to FIG. 5, FIG. 6 and FIG. 7, which show the preferred embodiment of the proposed electrically driven toothbrush when a grip component is meshed with the hollow handle.

As shown in the figures, the grip component 50 is a stereoscopic shaped body for being fitted on a portion of any one of the hollow handle 10 and the cap member 40 at an external edge of a part where the hollow handle 10 meshes with the cap member 40. In one embodiment of the present invention, the grip component 50, for instance, can be made of thermal plastic rubber (TPR).

A socket portion 14 is further disposed upon a body of the hollow handle 10 for meshing with the grip component 50. In this case, the grip component 50 is configured to be clamped into the socket portion 14 for enclosing the body of the hollow handle 10 as shown in FIG. 5 and FIG. 6.

For detailed configurations, please find referring to the figures at the same time, the grip component 50 according to the preferred embodiment of the present invention may further comprise an upper ring 502, a lower ring 504 and a joint portion 506. As shown in the figures, the upper ring 502 is able to fit with the socket portion 14. The lower ring 504 is configured for surrounding the opening 12 of the hollow handle 10, and the joint portion 506 which is connecting between the upper ring 502 and the lower ring 504 is disposed along at least one side of the hollow handle 10.

After the grip component 50 is clamped into the socket portion 14 and enclosing the body of the hollow handle 10 as shown in FIG. 6, the pair of spring 30 in connection with the electrical assembly module 20 are able to be inserted into the hollow handle 10 through the opening 12 of its second end. Later on, as shown in FIG. 7, the cap member 40 which is removably attached to the hollow handle 10 through the opening 12 closes the opening 12, thus forming an accommodation space for disposing the electrical assembly module 20 in electrical connection with the pair of spring 30 inside the hollow handle 10.

Herein, according to the embodiment of the present invention, the electrical assembly module 20 holds the pair of spring 30 in place within the accommodation space of the hollow handle 10. And therefore, after the cap member 40 meshes with the hollow handle 10 and closes the opening 12, it finishes completing packaging the foregoing components for composing the electrically driven toothbrush structure 1 of the present invention as shown in FIG. 2.

According to the embodiment of the present invention, the electrical assembly module 20, for example, can be a printed circuit board assembly (PCBA) or one module having an electrically operated motor disposed alternatively so as to generate a revolving force for turning on the electrically driven toothbrush structure 1. In one embodiment, when an electrical path with the electrical assembly module 20 is established and generates power to turn on the electrically driven toothbrush 1, the tooth brushing portion 11 is activated to vibrate and brush the user's teeth surface and to protect the teeth and the gums against dental plagues.

Figure 8:
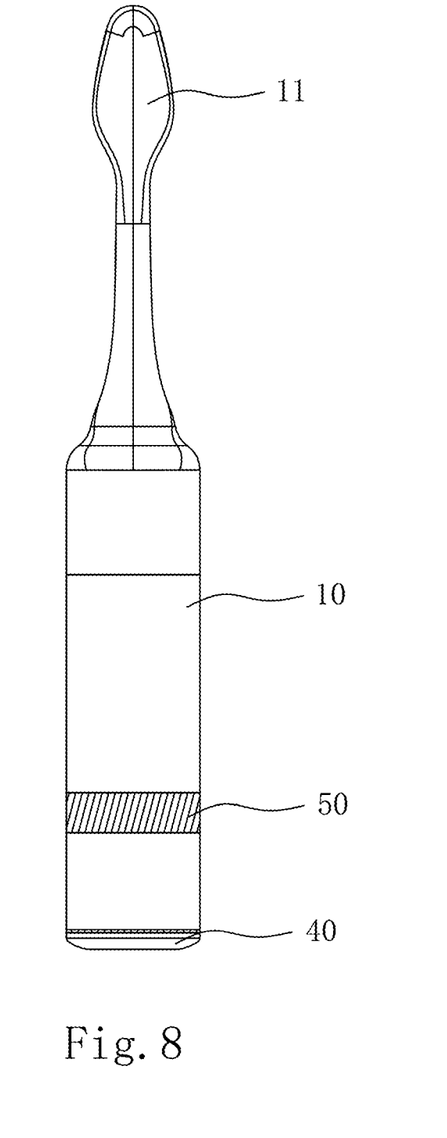
FIG. 8 shows a back view of the electrically driven toothbrush in accordance with a preferred embodiment of the present invention.
Figure 9:
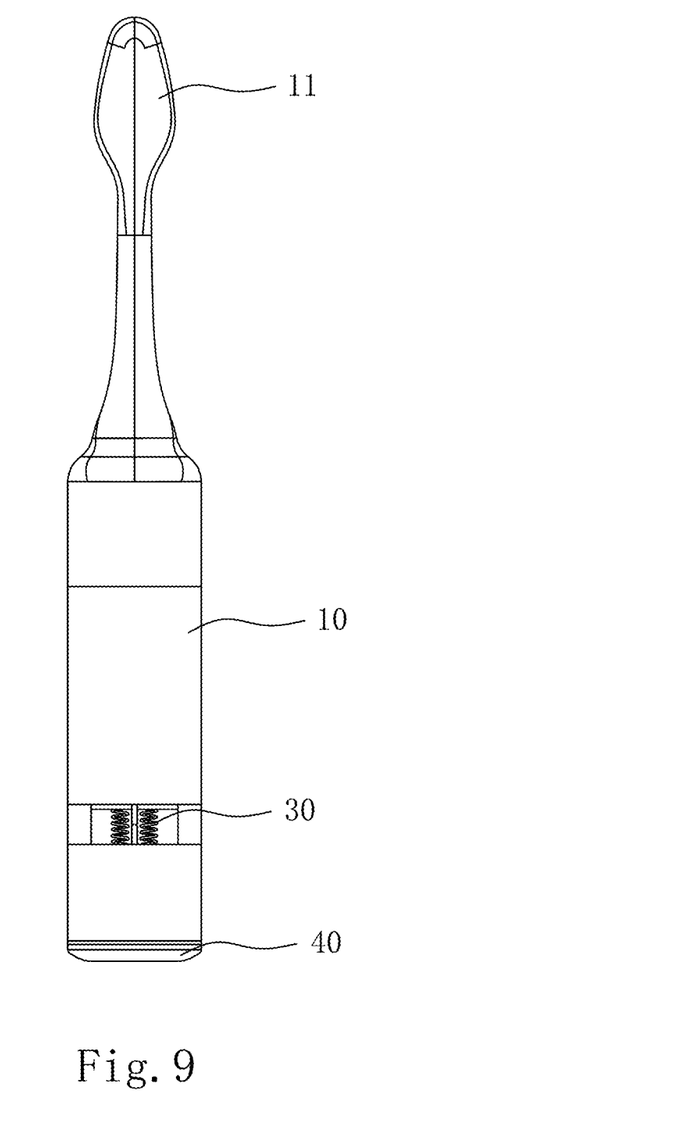
FIG. 9 shows a perspective view from FIG. 8 in accordance with a preferred embodiment of the electrically driven toothbrush.

Furthermore, please refer to FIG. 8 and FIG. 9, which show back views of the electrically driven toothbrush in accordance with a preferred embodiment of the present invention, wherein FIG. 9 is a perspective view from FIG. 8.

Figure 10:
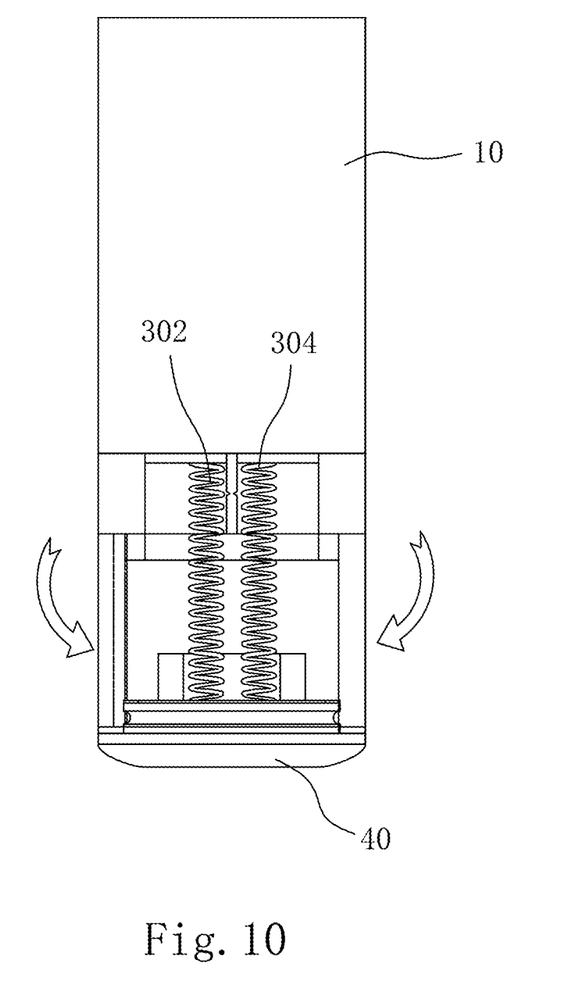
FIG. 10 shows an enlarged perspective view of the cap member of the electrically driven toothbrush in accordance with FIG. 9 before a user's operation as indicated.

FIG. 10 shows an enlarged perspective view of the cap member of the electrically driven toothbrush in accordance with FIG. 9 of the present invention. As seen, the cap member 40 fixes the pair of spring including the first spring coil 302 and the second spring 304 at one bottom end which is opposite to the other end in connection with the electrical assembly module. And, the first spring coil 302 and the second spring 304 were disposed separated in parallel before a user's operation as indicated by arrows in FIG. 10.

Figure 11:
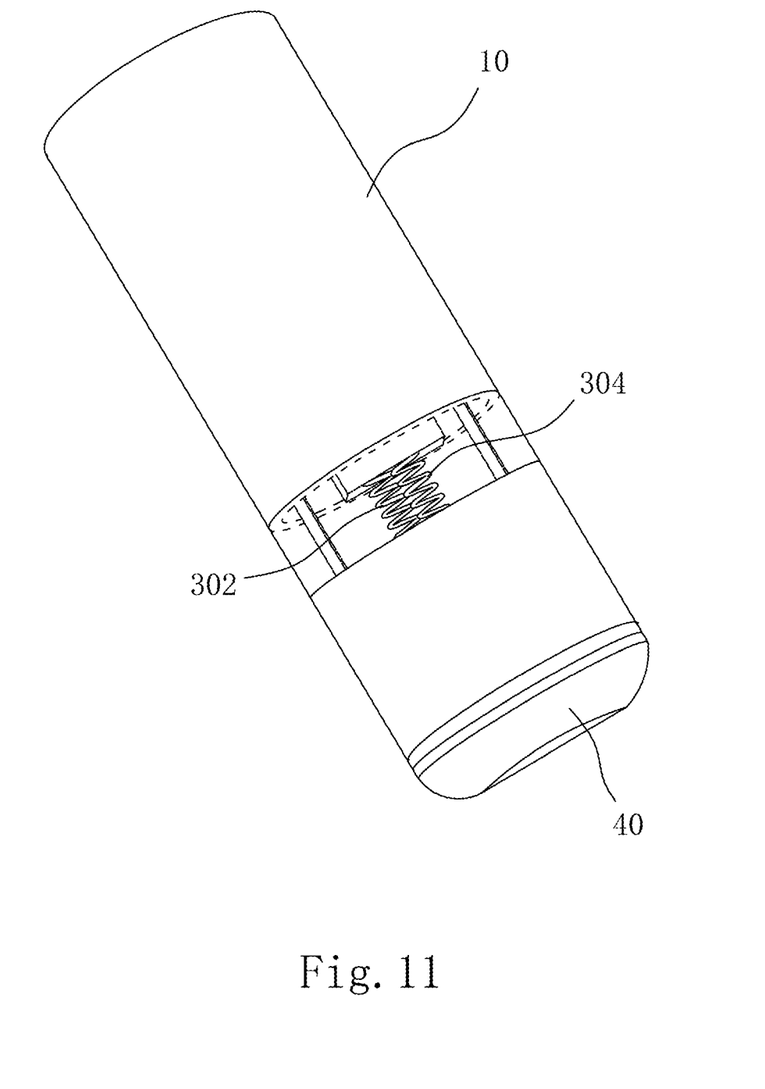
FIG. 11 shows an enlarged perspective view of the cap member of the electrically driven toothbrush in accordance with FIG. 9 after the user's operation when the pair of spring make contact with each other and become conductive.

FIG. 11 shows an enlarged diagram of the cap member of the electrically driven toothbrush in accordance with FIG. 9 after the user's operation. According to the embodiment of the present invention, when the user starts to bend the cap member 40 as indicated by arrows in FIG. 10, as it can be seen, the first spring coil 302 is getting to make contact with the second spring 304 of the pair of spring 30 due to the extrusion, whereby the pair of spring 30 become conductive and forms the electrical path which is leading to the electrical assembly module 20 and thus providing electrical power to turn on the electrically driven toothbrush 1. As a result, the tooth brushing portion 11 of the electrically driven toothbrush 1 can be successfully activated and perform predetermined cleaning process as designed.

Therefore, to sum up, it is obvious that the present invention indeed provides a novel and inventive electrically driven toothbrush structure which has never been seen or proposed ever before.

The proposed invention employs the bendable cap member, so when a user is ready for operating the proposed toothbrush structure, the user bends the cap member first. Subsequently, the pair of spring are in contact with each other due to the extrusion and become conductive, whereby forming an electrical path leading to the electrical assembly module and thus providing electrical power to turn on the electrically driven toothbrush structure. By employing the bendable cap member of the present invention, it is aimed so as to successfully and easily trigger and switch on the power driven toothbrush.

As such, the present invention is certainly not limited thereto. For people skilled in the art having understandings and technical solutions to the present invention, various modifications and changes are allowed to be followed without departing from the scope of the invention and yet still fall into the invention scope of the present application.

As compared to the prior design, it is proved that the proposed electrically driven toothbrush structure is advantageous of not only fair conveniences in use and low fabrication cost, but also less complexity and maintenance consuming. Thus, it is believed that the present invention structure is instinct, effective and highly competitive for a variety of field applications developed in the future and shall be patentable as well.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An electrically driven toothbrush, comprising:
   a hollow handle having a first end provided with a tooth brushing portion and a second end provided with an opening;
   an electrical assembly module providing power output to turn on said electrically driven toothbrush, and configured to be inserted into said hollow handle through said opening of said second end;
   a pair of spring being in connection with said electrical assembly module and inserted into said hollow handle; and
   a cap member which is removably attached to said hollow handle through said opening and closes said opening, forming an accommodation space for disposing said electrical assembly module in electrical connection with said pair of spring inside said hollow handle, wherein said cap member is bendable such that said pair of spring become conductive forming an electrical path to said electrical assembly module to generate power for turning on said electrically driven toothbrush.

2. The electrically driven toothbrush according to claim 1, wherein a socket portion is further disposed upon a body of said hollow handle, and a grip component is configured to be clamped into said socket portion for enclosing said body of said hollow handle.

3. The electrically driven toothbrush according to claim 2, wherein said grip component is made of thermal plastic rubber.

4. The electrically driven toothbrush according to claim 2, wherein said grip component is a stereoscopic shaped body for being fitted on a portion of any one of said hollow handle and said cap member at an external edge of a part where said hollow handle meshes with said cap member.

5. The electrically driven toothbrush according to claim 4, wherein said grip component further comprises an upper ring for fitting with said socket portion, a lower ring for surrounding said opening of said hollow handle, and a joint portion which is connecting between said upper ring and said lower ring and disposed along at least one side of said hollow handle.

6. The electrically driven toothbrush according to claim 1, wherein said cap member further fixes said pair of spring at one bottom end which is opposite to the other end in connection with said electrical assembly module.

7. The electrically driven toothbrush according to claim 6, wherein said pair of spring further comprises a first spring coil and a second spring coil which are disposed in parallel and having said first spring coil and said second spring connected to said bottom end to said cap member.

8. The electrically driven toothbrush according to claim 7, wherein when a user bends said cap member, said first spring coil makes contact with said second spring of said pair of spring such that said pair of spring become conductive and forms said electrical path.

9. The electrically driven toothbrush according to claim 7, wherein each of said pair of spring comprising said first spring coil and said second spring coil is further provided with a hook part, said electrical assembly module is further provided with a plurality of slots, and said hook part is configured to be clamped into said slot of said electrical assembly module so as to connect said pair of spring with said electrical assembly module.

10. The electrically driven toothbrush according to claim 9, wherein said electrical assembly module holds said pair of spring in place within said accommodation space of said hollow handle.

11. The electrically driven toothbrush according to claim 1, wherein said electrical assembly module is a printed circuit board assembly (PCBA).

* * * * *